May 18, 1943. S. J. G. PIRSON 2,319,764
METHOD AND APPARATUS FOR GEO-ELECTRICAL EXPLORATION
Filed Sept. 10, 1938 2 Sheets-Sheet 1
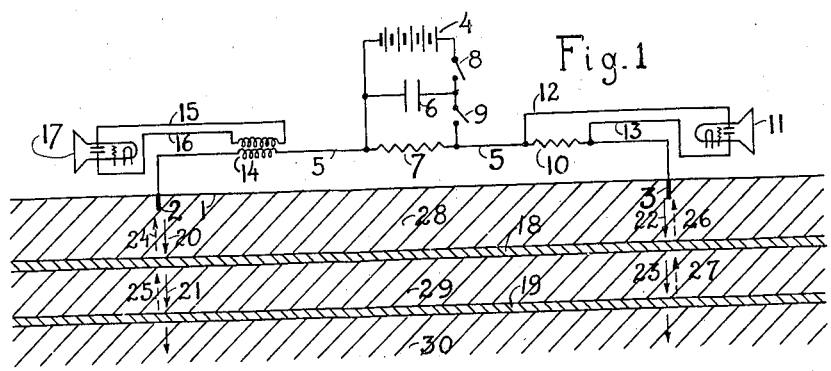
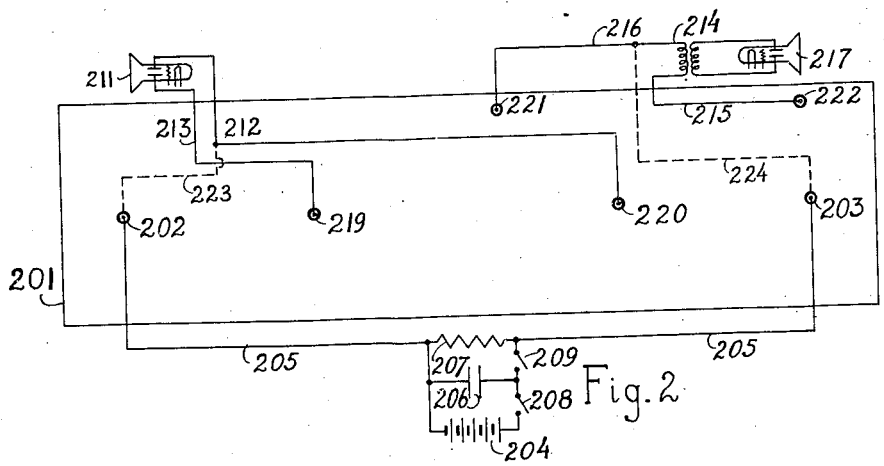
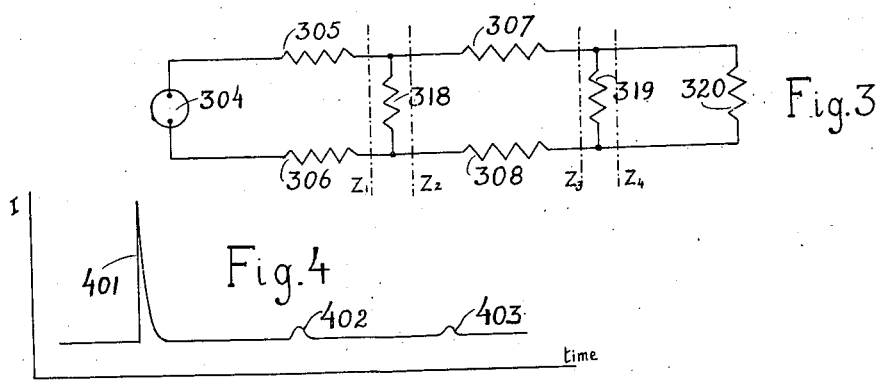
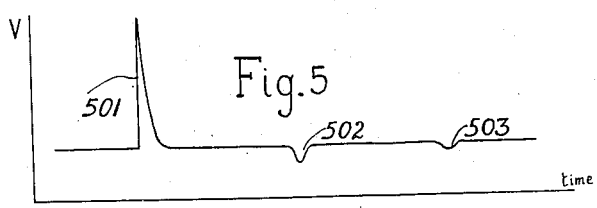
INVENTOR Patented May 18, 1943

2,319,764

UNITED STATES PATENT OFFICE 2,319,764

METHOD AND APPARATUS FOR GEOELECTRICAL EXPLORATION

Sylvain J. G. Pirson, State College, Pa., assignor of one-half to Shelley Krasnow, county of New York, N. Y.

Application September 10, 1938, Serial No. 229,312

31 Claims. (Cl. 175—182)

This invention relates to improvements in methods and apparatus for determining the presence of valuable minerals, oils, and other subterranean deposits. In a preferred form the invention comprises the use of an electric surge of sharp wave front and short duration traveling through the earth between electrodes embedded in the ground. As the electric surge travels through the ground and encounters strata of varying conductivity, part of the energy contained in the surge is reflected toward the surface of the earth and the reflected impulses are recorded at a plurality of points. An important application of the method consists in logging cased bore holes drilled through the geologic strata, which strata it is desired to further investigate and correlate.

The invention will be fully understood from the following description read in connection with the accompanying drawings in which Fig. 1 is a diagram showing the method of causing the electric surge to travel through the earth and recording the reflected electric impulses as they come back through the energizing circuit.

Fig. 2 is a diagram showing the method of causing the electric surge to travel through the earth and recording the reflected electric impulses by means of separate electrodes and circuit.

Fig. 3 represents the electric circuit equivalent to the combination of resistances and conductances of the sequence of geologic strata shown in Fig. 1.

Figs. 4 and 5 are diagrams showing typical curves obtained.

Figure 7:
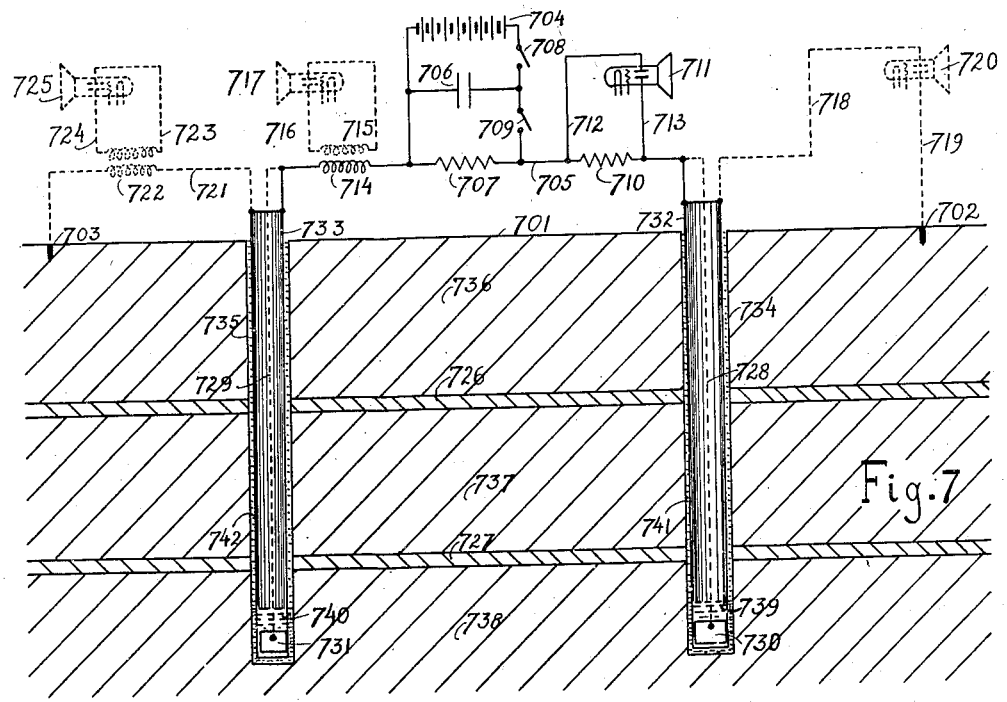
Fig. 7 is a diagram showing the method of causing the electric surge to travel through the casings of two neighboring bore holes and the surrounding strata and of recording the reflected electric impulses by means of various combinations of circuits.

Referring to Fig. 1, reference number 1 indicates the surface of the earth. Electrodes 2 and 3 are embedded in the earth and connected to an apparatus suitable to produce an electric surge of relatively high voltage, steep wave front and short duration which, as a preferred combination, comprises an electric current source 4, a capacity 6, switches 8 and 9 and a resistance 7. Resistance 7 is in series with the energizing circuit 5 connecting to electrodes 2 and 3. A resistance 10 is in series with the energizing circuit 5 and conductors 12 and 13 connect an indicating instrument preferably a cathode ray oscillograph in parallel with resistance 10. 18 and 19 represent geologic strata in the earth which it is assumed have a larger conductance than the surrounding strata 28, 29 and 30. Arrows 20, 21, 22 and 23 indicate the direction of propagation of the electric surge wave front and arrows 24, 25, 26 and 27 indicate the direction of propagation of the reflected electric impulses.

For the purpose of carrying out this invention it is immaterial what type of electrodes are used provided adequate contact is obtained with the earth. The distance between the electrodes depends on the depth of penetration of the surge which it is desired to reach and this distance may be widely varied. The shape of the electric surge to be caused to travel through the earth is of special importance; it must have a steep wave front, rising to its maximum peak voltage in possibly less than one-tenth of a microsecond and decaying to an inappreciable value in less than five microseconds and preferably less than three microseconds. For most purposes good results can be obtained by using a peak voltage of the electric surge of one thousand volts but when great depths of penetration are required, larger peak voltages should be used up to several thousand volts.

In operating the apparatus shown in Fig. 1 in order to carry out the invention, switch 8 is closed while switch 9 is left open. The capacity 6 is then charged to a voltage substantially equal to that of the source, switch 8 is then opened and switch 9 closed. The capacity 6 discharges then in the circuit composed of resistance 7, switch 9 and capacity 6. The rapidity of decay of the voltage difference created through resistance 7 by the discharge of the capacity is controlled by the magnitude of the resistance. This decay should be such that after a few microseconds less than one-tenth of one percent of the original voltage of capacity 6 remains across resistance 7. By this procedure a wave of short duration with steep front and rapid decay is obtained; this type of wave is hereinafter consistently called an electric surge. The type of energizing which is applied to the earth in order to carry out the present invention is thus essentially different from that hitherto used in other methods of geophysical prospecting. I am aware that continuous oscillating waves have been used heretofore for determining underground structures but they are quite different in characteristics from the one herein described. The electric surge used in order to carry out the present invention is not continuous nor direct as it decays in an extremely short interval of time, it is not oscillating as it does not change in sign but it is of the nature of a shock limited to but one pulsation.

The non-oscillatory condition of the energizing surge is not, however, an absolute requirement, provided the frequency of oscillation is relatively high and the damping factor is high in order that the amplitude of the oscillations may be reduced to a small fraction of the original impulse's amplitude after a short period of time. By way of example, the amplitude of the oscillations after 10 microseconds. This should preferably be less than one per cent of the original impulse's voltage. The type of energizing voltage may be better defined by means of a formula where the instantaneous value of the surge voltage applied is given as a function of an independent variable (time), hereinafter represented by the symbol $t$. The type of electrical surge required to carry out my process may be represented generally by $$\frac{E}{A}(\epsilon^{+\alpha t} - \epsilon^{-\alpha t})$$

in which formula:

$E$ represents the maximum voltage available from the source of electric energy;

$\epsilon$ is the base of natural logarithms;

$A$ and $\alpha$ are constants, depending on the electrical characteristics of the energizing circuit, and these constants may be real or imaginary. These constants are so chosen that the type of electric surge obtained from the energizing circuit will satisfy the requirements previously explained, particularly concerning the damping of the energizing wave.

An advantage of this type of energizing in geophysical prospecting is the comparatively large energy which may be sent into the earth during such a short duration of time without resorting to the use of powerful sources of energy. Surge generators have been described in the technical literature which may be advantageously used to carry out this invention. (See: E. Max—Elektro. Tech. Zeit.—1924—p. 652.)

The electric surge produced as described above will travel through the energizing circuit 5 preferably made of a well insulated cable, reach the ground electrodes 2 and 3 and penetrate through the earth where it encounters material of heterogeneous composition. For simplification two horizontal geologic strata 18 and 19 have been represented on Fig. 1 and are embedded in strata 28, 29 and 30, which strata are assumed to be of uniform and identical composition but different from 18 and 19. From an electrical point of view, the system through which the electric surge will travel may be represented by Fig. 3 in which 304 is the surge generator, 305 and 306 are the resistances representing the energizing circuit's resistance and the resistance of the surface stratum 28 immediately underneath the electrodes, 318 represents the conductance of geologic stratum 18 of Fig. 1, 307 and 308 are the resistances of stratum 29 under each electrode, 319 is the resistance of stratum 19, 320 is the resistance to the wave's propagation in stratum 30. This simplified theory serves to explain that the resistance to the wave's propagation through the ground is similar to the impedance of a transmission line such as Fig. 3. It is well known that when an electric surge travels in a transmission line, a portion of the surge's voltage and current intensity are reflected and travel back toward the source when said surge reaches a transition point where the circuit constants or surge impedance changes, the remainder of the surge however is transmitted producing a new surge reflection when the wave reaches a new transition point. If the surge impedance of the line is $Z_1$ before the traveling surge reaches a transition point and $Z_2$ after passing it, the amplitude of the reflected voltage $e_r$ is given by $$e_r = e\frac{Z_2 - Z_1}{Z_2 + Z_1}$$

and the amplitude of the reflected current $i_r$ is given by $$i_r = i\frac{Z_2 - Z_1}{Z_2 + Z_1}$$

in which formulae $e$ is the voltage of the incident traveling surge and $i$ is its current intensity. (See: Standard Handbook for Electrical Engineers—p. 1403—sixth edition.) The reflected electric impulses travel in a direction opposite to the propagation of the energizing electric surge and may be detected at the surface of the earth by various combinations of electric circuits. In one type of combination a resistance 10 is inserted in series with the energizing circuit and an indicating instrument preferably a cathode ray oscillograph 11 is connected in parallel with resistance 10 by means of conductors 12 and 13. The types of curves which will be obtained upon the oscillograph are represented on Figs. 4 and 5. In Fig. 4, the impulse 401 is the energizing surge showing its steep wave front to the left and its rapid decay to the right, impulse 402 corresponds to the electric impulse reflected from the first good conducting stratum 18 in the earth; it is spaced from the energizing surge 401 by an interval of time corresponding to the depth of the stratum 18 below the surface of the earth and the velocity of propagation through the overlying formation 28. Similarly impulse 403 is spaced from impulse 402 by an interval of time corresponding to the thickness of stratum 29 and its velocity of propagation. Fig. 4 is the type of record obtained by using a recording instrument sensitive to current intensity. By using an oscillograph sensitive to voltage a record as represented on Fig. 5 would be obtained. As the electrodes 2 and 3 are moved away from each other the number of impulses such as 402 and 403 will increase as more and more volume of the earth will be subject to the influence of the energizing surge thus increasing the likeliness of more strata producing reflections, as deeper beds will be reached by the electric surge with sufficient intensity to give a measurable reflected impulse. The duration and the amplitude of the reflected impulse are an indication of the thickness of the reflecting strata and of its relative electric characteristics. Similar records to those represented on Figs. 4 and 5 may also be obtained by means of a transformer 14 whose primary winding is inserted in the energizing circuit and the secondary winding connected by means of conductors 15 and 16 to an oscillograph 17. The use of a transformer eliminates the possibility of natural earth currents disturbing the measurements.

Having obtained the desired indications for the electrodes 2 and 3 as located in an area under investigation, the electrodes are moved to another location where additional readings are obtained. In general the line of investigation will be moved in the form of a profile with the electrode lines disposed end to end and subsequently they may be moved to investigate profiles parallel to the original one. The different lines of electrodes may also overlap each other by any desired amount.

As the equipment is moved over the region to be tested, a number of records will be obtained showing at each location of test the number of geologic strata which have given characteristic reflections, their individual electrical characteristics and the space separation from each other. This affords a convenient means of correlation of geoolgic strata from station to station.

Fig. 2 represents in plan view an alternative method of practising the invention. 201 represents the surface of the earth in which are embedded electrodes 202 and 203 connected to the energizing circuit 205 and the surge generator comprising the voltage source 204, the capacity 206, the switches 208 and 209 and the resistance 207. Two other electrodes 219 and 220 are also embedded in the surface of the ground and preferably in line with the energizing electrodes 202 and 203 but not necessarily so. The receiving electrodes 219 and 220 are connected by means of conductors 213 and 212 to a recording oscillograph 211 which will indicate the reflected electric impulses, as well as give an indication of the start of the electric surge, as there is usually sufficient inductive coupling between the energizing circuit and the receiving circuit in order to indicate a large impulse in the energizing circuit but not for the smaller impulses reflected by the geologic strata. A record of the types indicated on Fig. 4 or 5 will thus be obtained for a given location of electrodes 219 and 220. By moving these electrodes to other locations, such as 221 and 222 in the area affected by the energizing circuit other similar records will be obtained, the records may be correlated in order to derive therefrom the subsurface geologic structure. In order to eliminate again the disturbance caused by natural earth currents, the receiving electrodes 221 and 222 may be connected to the recording oscillograph 217 by the intermediacy of a transformer 214. Alternative procedures are indicated by connections 223 and 224.

Figure 6:
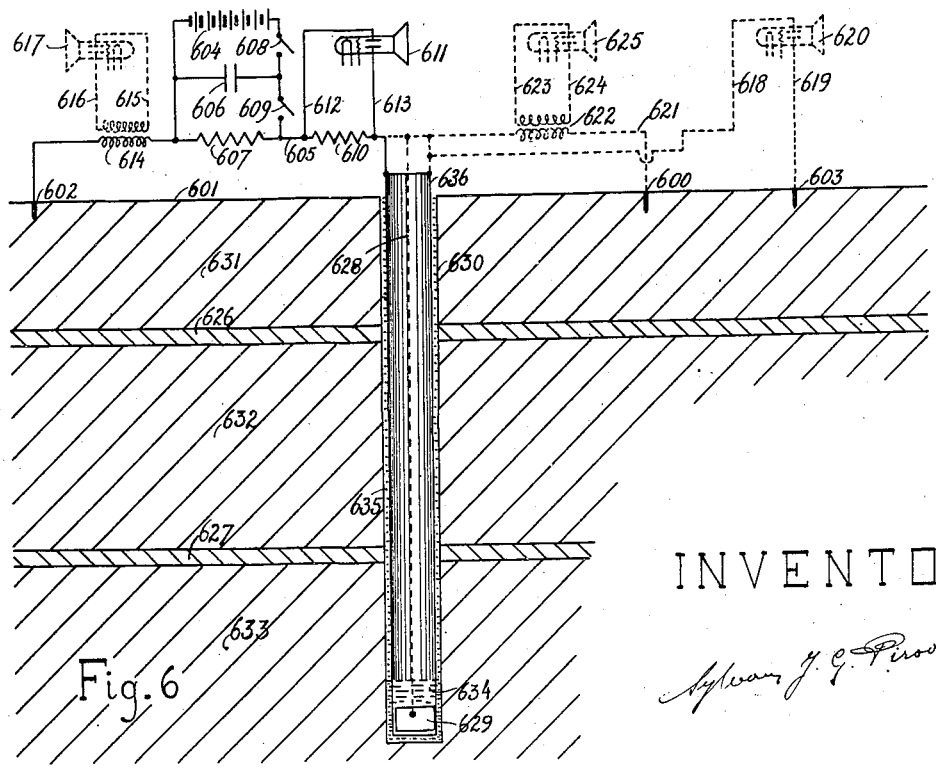
Fig. 6 is a diagram showing the method of causing the electric surge to travel through the casing of a bore hole and the surrounding strata and of recording the reflected electric impulses by means of various combinations of circuits.

An important application of the present invention consists in the electrical logging of cased bore holes. Figs. 6 and 7 are schematic diagrams which represent the various combinations of electrical circuits which may be used in order to apply the method of geo-electrical exploration herein disclosed to the determination of the nature, thickness and depth below the surface of the geologic strata which a bore hole has encountered during the process of drilling. This method is of particular advantage where rotary drilling is used and where sufficiently good samples of the geologic formations may not have been obtained during the process of drilling. The method is also of particular advantage in locating the presence of water bearing and oil bearing horizons which may not have been identified during the process of drilling. The method is further of great advantage in permitting the logging of cased bore holes drilled when the practice of saving samples was not established and for which no geologic information is consequently available. The presence of a casing in a bore hole is not a hindrance to the application of the present method of logging as it is for other methods now employed in logging uncased holes; on the contrary the casing serves as a conductor carrying the energizing surge to greater depths than are normally possible when ground electrodes are used.

In Fig. 6, 601 is the surface of the earth, 636 is the casing of the bore hole 630 which encounters in particular the geologic strata 626 and 627 of electrical characteristics different from that of the strata 631, 632 and 633, which last three strata are assumed to be homogeneous and identical in their electrical characteristics for the purpose of simplification. A ground electrode 602 embedded in the surface of the earth 601 is connected to the casing 636 by means of energizing circuit 605 which is connected in series with resistance 607. In parallel with resistance 607 is connected the surge generator consisting of an electrical source 604, a capacity 606 and two switches 608 and 609. The operation of the surge generator has been described here above. I am aware that other surge generators may be devised which will accomplish the same purpose. The one herein described was chosen for its simplicity. The reflected electric impulses may be received upon a recording oscillograph 611 by means of a resistance 610 in series with the energizing circuit 605 or in an alternative way through the intermediacy of a transformer 614 whose primary winding is inserted in the energizing circuit and the secondary winding is connected by means of conductors 615 and 616 to the recording instrument 617. The reflected electrical impulses may also be recorded by means of a separate recording electric circuit comprising conductors 618 and 619, and oscillograph 620 and connected to ground electrode 603. An alternative way of using a separate recording circuit consists in introducing a transformer 622 in line with conductor 621 and connecting to ground electrode 600. The oscillograph 625 is connected to the secondary winding of transformer 622. The use of a transformer in the recording circuit avoids the influence of natural ground currents which may occasionally be so intense as to otherwise prevent the measurements. The operation of the apparatus is as follows: as the electric surge is generated and sent to travel through the energizing circuit 605 and casing 636, the traveling wave successively encounters geologic strata 626 and 627. As at each of these beds there exists a change in the impedance of the conducting mass constituted by the earth surrounding the casing, electric impulses are reflected and travel in opposite direction to the original direction of travel of the wave. The reflected impulses are recorded on the oscillograph and records similar to those shown on Fig. 4 or 5 will be obtained depending on whether the oscillograph is current or voltage sensitive and according to the respective values of the electric conductivities of reflecting beds 626 and 627 and of formations 631, 632 and 633.

An alternative way of carrying out the method of logging cased bore holes consists in making contact with the bottom of the casing as shown on Fig. 6 by means of a suitably insulated cable 628 and electrode 629 lowered to the bottom of the well into which a conducting liquid 634 has previously been poured.

Another alternative way of carrying out the method of logging cased bore holes consists in making use of a neighboring cased bore hole of approximately the same depth as the one to be logged. Such a procedure is represented diagrammatically by Fig. 7 where casings 732 and 733 of bore holes 734 and 735 are connected by the energizing circuit 705 to the surge generator composed of the electric source 704, the capacity 706 and the switches 708 and 709. Contacts to the casings may be made near the surface of the earth 701 or at the bottom of the well by means of suitable insulated cables 728 and 729 and electrodes 730 and 731. 739 and 740 represent some conducting liquid poured from the surface in order to insure good contact between the electrodes 730 and 731 and the casings 732 and 733. Recording on an oscillograph of the electrical impulses which will be reflected by the geologic strata 726 and 727 of electrical characteristics different from the embedding formations 736, 737 and 738, will be accomplished in manners identical with the procedures previously disclosed, either through a resistance 710 in series with the energizing circuit or through a transformer 714 whose primary winding is in series with the energizing circuit, or through the intermediacy of ground electrodes 702 or 703 connected to the casing of one of the wells and connected either directly to the oscillograph 720 or through a transformer 722 inserted in the receiving circuit. In recording the reflected electrical impulses generated by the travel of an electric surge sent through the casings of both wells, records similar to those represented by Fig. 4 or 5 will again be obtained depending on whether the oscillograph is current or voltage sensitive and according to the respective values of the electric conductivities of reflecting beds 726 and 727 and of the formations 736, 737 and 738. For best results in electrical logging good contact between casing and geologic strata should be insured through a conducting liquid 635 or 741 and 742.

In all procedures herein disclosed it is of particular advantage to adjust the impedance of the energizing circuit to the impedance of the mass of the earth energized between the points of application of the surge to the earth this in order to avoid undue reflexions at the points of transition between the energizing circuit and the earth.

It should be borne in mind that the term "casing," as used in the specification and claims, includes drill pipe and tubing as well as well casing, and also it is not necessary that the well be cased inasmuch as the metal of a wire line lowered into the hole may serve if the well bore contains an electric-conducting fluid.

Various changes and alternative arrangements may be made within the scope of the appended claims in which it is my intention to claim all novelty inherent in the invention as broadly as the prior art permits.

I claim:

1. In a method of determining underground structure the improvement which comprises causing an electric surge to travel through the earth between spaced electrodes embedded in the surface of the earth and receiving the electric impulses reflected by the geologic strata upon an electric circuit in which there is a suitable indicating instrument, the duration being such that said electrical surge terminates before said reflected electrical impulses are received.

2. Method according to claim 1 where the receiving electric circuit makes contact to the ground at other points than those being energized.

3. Method of geophysical exploration which comprises establishing an area submitted to the influence of a traveling electric surge, establishing a plurality of testing stations in said area, receiving the electric impulses reflected by the geologic strata at each of said stations and determining the underground structure by correlating the data so obtained, the duration of said electrical surge being such as to decay before reception of said reflected impulses.

4. Apparatus for geophysical exploration comprising a pair of spaced electrodes embedded in the earth, means for causing an electric surge of short duration the voltage of which varies in time substantially according to the formula $$\frac{E}{A}(\epsilon^{+\alpha t} - \epsilon^{-\alpha t})$$

to travel in the earth between said electrodes, a resistance in series with the energizing circuit, and an electric circuit connected in parallel with said resistance and including an oscillograph for indicating the electric impulses reflected by the geologic strata, the duration of said electric surge being such that it decays before reception of said reflected electric impulses.

5. Apparatus according to claim 4 where a transformer is inserted in the energizing circuit instead of a resistance.

6. In the electrical logging of a cased bore hole, the method which comprises causing an electric surge to travel through the casing of said bore hole and the surrounding geologic strata and receiving the electric impulses reflected by the geologic strata upon an electric circuit in which there is a suitable indicating instrument.

7. Apparatus for the electrical logging of a cased bore hole comprising means for causing an electric surge to travel through the casing of said bore hole and the surrounding geologic strata and an electric circuit for receiving the reflected electric impulses including a suitable recording instrument.

8. Apparatus according to claim 7 where the reflected electric impulses are received through the intermediacy of a resistance connected in series with the energizing circuit.

9. Apparatus according to claim 7 where the reflected electric impulses are received through the intermediacy of a transformer inserted into the energizing circuit.

10. Apparatus according to claim 7 where the receiving circuit is connected to the casing and to an electrode embedded in the earth at a distance from the bore hole.

11. Apparatus according to claim 7 where the energizing circuit makes contact to the casing near the surface of the ground.

12. Apparatus according to claim 7 where the energizing circuit makes contact to the casing at the bottom of the bore hole by means of a cable and electrode.

13. In the electrical logging of a cased bore hole, the method which comprises causing an electric surge to travel through the casings of two neighboring bore holes and receiving the electric impulses reflected by the geologic strata upon an electric circuit in which there is a suitable indicating instrument.

14. Apparatus for the electrical logging of a cased bore hole comprising means for causing an electric surge to travel through the casings of two neighboring bore holes and the surrounding geologic strata and an electric circuit for receiving the reflected electric impulses including a suitable recording instrument.

15. Apparatus according to claim 14 where the receiving circuit is connected in parallel with a resistance connected in series with the energizing circuit.

16. Apparatus according to claim 14 where the receiving circuit is connected to the energizing circuit by means of a transformer.

17. Apparatus according to claim 14 where the receiving circuit is connected to the casing of one of the bore holes and to an electrode embedded in the earth at a suitable distance from said casing.

18. Apparatus according to claim 14 where the energizing electric circuit makes contact with the casings of the two bore holes near the surface of the ground.

19. Apparatus according to claim 14 where contact of the energizing electric circuit with the casings of the two bore holes is made near the bottom of each well by means of suitable cables and electrodes.

20. Method according to claim 6 where contact between the casing of the bore hole and the geologic strata is insured by interposing between said casing and geologic strata a suitable conducting liquid.

21. In the determination of underground structures, the method which comprises: causing an electrical surge to travel through the earth from an input circuit to a plurality of receiving circuits, and recording the impulses reflected by the geologic strata and received by said receiving circuits, the duration of said electrical surge being such as to decay before the reception of said reflected impulses.

22. An apparatus for electrical logging of cased bore holes comprising: means for causing an electrical surge to travel through the casing of said bore hole and surrounding geologic strata; and an electric circuit for receiving the reflected electrical impulses, including: a primary circuit having a contact engaging said casing and an electrode embedded in the earth at a distance from the casing, and an inductively coupled secondary circuit including an instrumentality for indicating the reflected impulses received by said receiving circuit.

23. An apparatus for electrical logging of a cased bore hole, comprising: means for causing an electric surge to travel through the casings of two neighboring cased bore holes and surrounding geologic strata and an electric circuit for receiving the reflected electric impulses, including a primary circuit having an electrical connection with the casing of one of said well bores and an electrode earthed at a distance therefrom, and a secondary circuit inductively coupled to said primary circuit and including an instrumentality for indicating reflected electrical impulses.

24. A method of determining underground structures, characterized by: creating in the region to be investigated an initial electrical surge capable of establishing measurable reflected surges when passing through formations of different electrical characteristics; receiving and recording said initial surge and said reflected surges, the duration of said initial surge being such that its record as received subsides before the reflected surges are received, whereby the initial and reflected surges are segregated in time.

25. A method of electrically surveying underground structures wherein an electrical surge is applied to the region to be investigated and the applied electrical surge, as well as electrical surges that may reflect from the different underground structures which comprise the region, are received for analysis, characterized by: applying an electrical surge of such short duration that it decays to nominal value before the reflected surges are received.

26. A method of determining underground structure which comprises: causing an electric surge to travel through the earth between spaced electrodes embedded in the surface of the earth and receiving the electric impulses reflected by the geologic strata upon an electric circuit in which there is a suitable indicating instrument and in which the impedance of the energizing circuit is substantially adjusted to the value of the impedance of the earth mass between the points of application of the electric surge to said earth mass.

27. In the electrical logging of a well bore having a continuous electric-conducting medium, a method which comprises: causing an electric surge to travel through the electric-conducting medium in said bore hole and the surrounding geologic strata and receiving the electric impulses reflected by the geologic strata upon an electric circuit in which there is a suitable indicating instrument.

28. An apparatus for electrical logging of a well bore containing a continuous electric-conducting medium comprising: means for causing an electric surge to travel through said medium contained in said bore hole and also the surrounding geologic strata; and an electric circuit for receiving reflected electrical impulses, including a suitable recording instrument.

29. An apparatus for electrical logging of a well bore containing a continuous electric-conducting medium comprising: means for causing an electric surge to travel through said medium contained in said bore hole and also the surrounding geologic strata; and an electric circuit for receiving the reflected electrical impulses, including a primary circuit in electrical association with said medium and an electrode embedded in the earth at a distance from said well bore, and an inductively coupled secondary circuit including an instrumentality for indicating the reflected impulses received by said receiving circuit.

30. An apparatus, as set forth in claim 29, wherein the electric surge caused by said means substantially terminates before the reflected impulses are received by said receiving circuit.

31. In a method of electrically logging well bores containing a continuous electric-conducting medium characterized by: causing an electric surge to travel through said medium and surrounding geologic strata; receiving the reflected electrical impulses, the duration of said surge being such that the surge is substantially decayed before the reflected impulses are received.

SYLVAIN J. G. PIRSON.